United States Patent Office 2,720,256
Patented Oct. 11, 1955

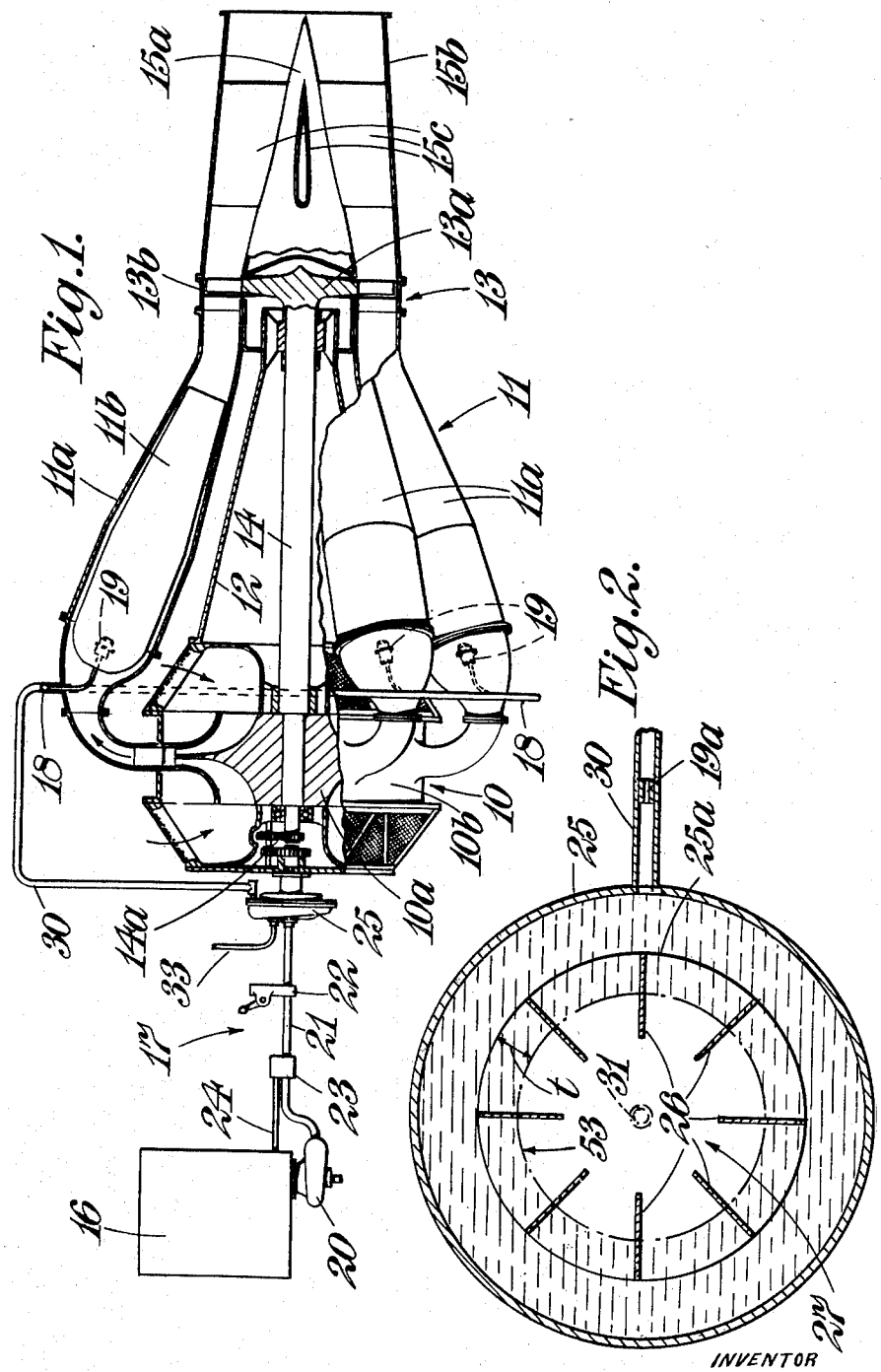

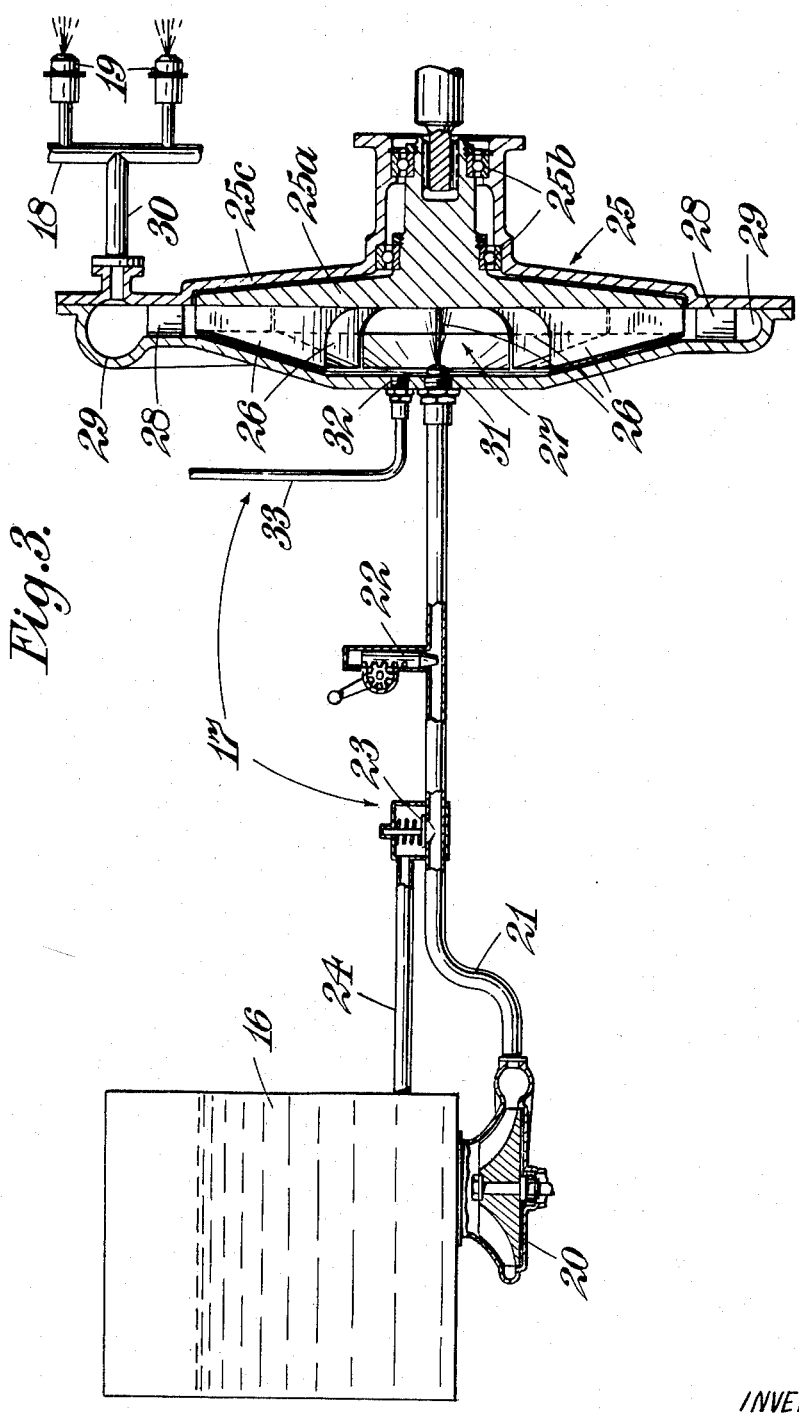

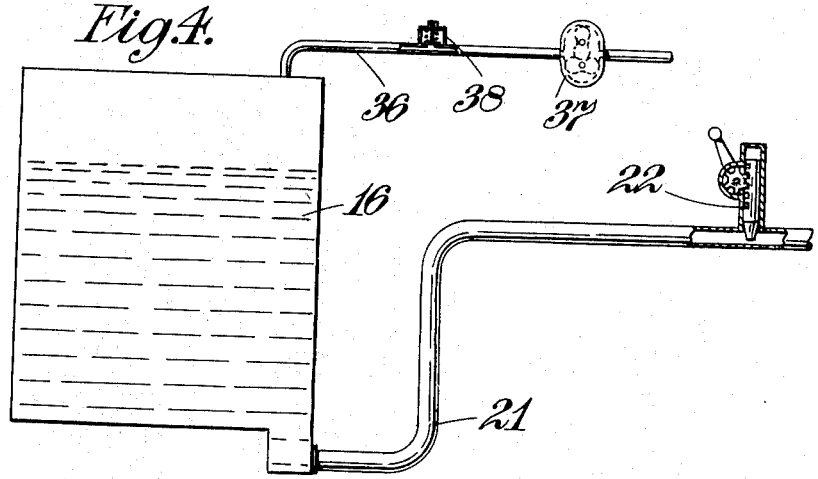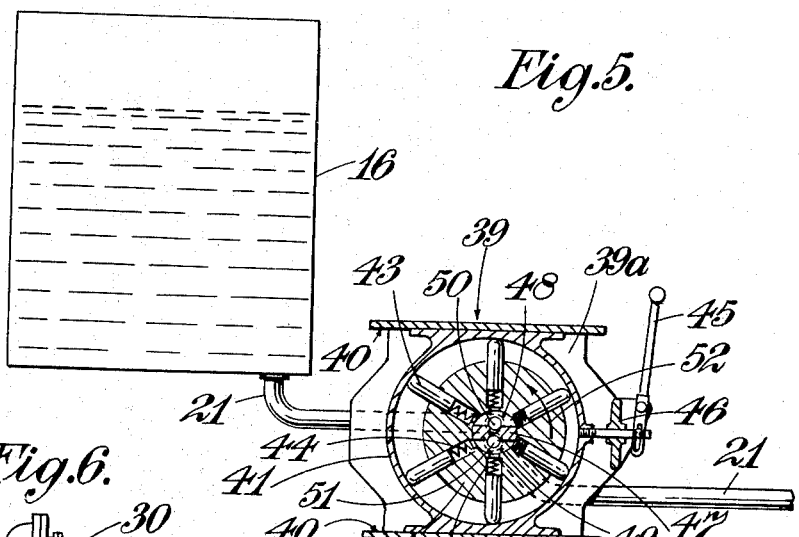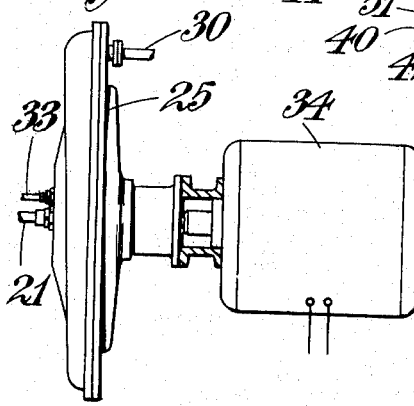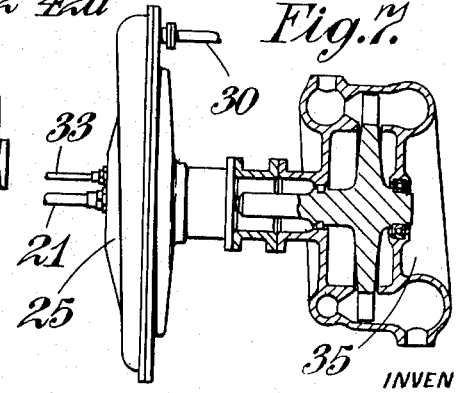

2,720,256

FUEL SYSTEMS FOR INTERNAL COMBUSTION ENGINES AND FUEL PRESSURIZING PUMPS THEREFOR

Harry Pearson, West Nuthall, England, assignor to Rolls-Royce Limited, Derby, England, a British company Application May 8, 1951, Serial No. 225,091

Claims priority, application Great Britain May 12, 1950

6 Claims. (Cl. 158—36.4)

This invention relates to fuel systems for internal combusion engines and to fuel-pressurizing pumps for use in such fuel systems.

The invention is concerned with fuel systems including a fuel-pressurizing pump arranged to be supplied with fuel from a low-pressure source of fuel, and arranged to deliver the fuel to fuel-injection means on the delivery side of the pump.

A primary object of the invention is to provide an improved fuel-pressurizing pump arrangement and an improved fuel-system having variable-fuel-delivery characteristics which avoid the use of capacity-changing mechanisms in the fuel-pressurizing pump.

According to an aspect of the invention a fuel-pressurizing pump for use in a fuel system of an internal-combustion engine comprises a casing, a centrifugal impeller in said casing, said impeller having vanes extending over the radially outer portion of the impeller to leave a vane-free space centrally of the impeller, a fuel inlet connection to feed fuel into said vane-free space, and a delivery connection from said casing at a location radially outside said impeller, said delivery being adapted for connection to flow-restricting means having preselected flow characteristics such that, for each flow in a range of metered inlet flows, the fuel pressure necessary in the delivery connection upstream of the flow-restricting means to give a corresponding delivery flow is developed with a radial depth of fuel in the impeller less than the radius of the impeller.

According to another aspect of the present invention, a fuel system for an internal combustion engine includes a centrifugal fuel-pressurizing pump comprising a casing and an impeller in the casing, a low-pressure fuel-metering device connected to deliver a metered quantity of fuel to the inlet eye of the centrifugal impeller, and flow-restricting means connected with the delivery of the fuel-pressurizing pump and having such flow characteristics that the delivery pressure necessary to obtain a flow through said flow-restricting means corresponding to the metered delivery to the inlet eye of the impeller is obtained with a radial depth of fuel in the impeller less than the radius of the impeller.

In operation of such an arrangement, therefore, the pump does not run full and there is formed centrally of the impeller a space which is unoccupied by fuel and is bounded by a free radially-inwardly-facing fuel surface. Moreover, in operation, for each inlet fuel flow, the radial fuel depth in the pump will stabilize at a value dependent on the required delivery pressure and on the impeller rotational speed.

For large metered fuel flows to the inlet side of the pump, a high delivery pressure will be required, which in turn will require a large "fuel depth" in the centrifugal impeller. For small inlet flows the delivery pressure required will be correspondingly low, and in turn the "fuel depth" in the impeller will be comparatively small. The term "fuel depth" is employed to indicate the depth measured radially of the impeller axis from its tip to the free liquid fuel surface.

In addition to avoiding the necessity of providing a capacity-changing mechanism in the fuel-pressurizing pump, adoption of the invention avoids or reduces cavitation effects in the intake of a centrifugal pump, such as is experienced when such pumps are designed to run full. It will be appreciated that cavitation effects which are accentuated by aeration or vaporization of the fuel may give rise to instability of delivery, which is undesirable, in the use of centrifugal pumps on internal-combustion-engine fuel-supply systems.

The flow-restricting means on the delivery side of the pump is preferably afforded by fuel injector means having preselected flow characteristics.

Any suitable or convenient means can be used for metering the fuel flow on the low-pressure side of the pump, for example a variable volumetric-capacity positive-displacement pump can be used, and since the pump will be operating at low pressures the difficulties which arise in the design and manufacture of high-pressure variable volumetric capacity pumps can be avoided. Alternatively, the flow may be metered by a flow-restricting device, such as a throttle supplied on its upstream side by a low-pressure fuel source; in one such arrangement there is provided a low-pressure centrifugal pump arranged by means of a relief valve to deliver fuel at constant pressure to the upstream side of a throttle.

It is preferred that fuel being fed to the pump should be injected into the eye of, or a hollow space within, the impeller in the form of a solid or atomized jet. In one preferred arrangement the jet is caused to impinge against a surface of the impeller which is normal to the axis of rotation of the impeller, so that the fuel travels outwards along this surface under centrifugal action. The eye or hollow space within the impeller should be vented, for example to atmospheric pressure, the vent being arranged at such a location as to avoid major leakage of fuel from the pump.

Some embodiments of this invention will now be described by way of example reference being made in the description to the accompanying drawings, in which Figure 1 is a view of a known form of gas-turbine engine fitted with a fuel system of this invention, Figure 2 is a diagram illustrating an operating characteristic of the fuel system, Figure 3 illustrates in more detail the fuel system shown in Figure 1, Figure 4 illustrates another form for part of the fuel system, Figure 5 illustrates yet another form for this part of the fuel system, and Figures 6 and 7 illustrate modifications.

Referring to Figure 1, there is shown one form of fuel system of this invention applied to supply fuel to a known gas-turbine engine.

The gas-turbine engine comprises a compressor 10, shown as a centrifugal compressor of the double entry kind having a rotor 10a and a stator 10b; combustion equipment 11 connected to be supplied with compressed air from the compressor 10 and to have fuel burnt therein, the combustion equipment being illustrated as the kind comprising a number of air casings 11a each housing a flame tube 11b and disposed around a casing member 12; a turbine 13 connected to the combustion equipment to receive hot gas therefrom and arranged to drive the compressor, the turbine being shown as an axial-flow turbine having a rotor 13a drivingly connected to the compressor rotor 10a by a shaft 14, and a stator casing 13b; and an exhaust unit 15 having inner and outer walls 15a, 15b of which wall 15a is conical and is supported from the wall 15b by means including aerofoil-sectioned struts 15c.

The fuel is supplied from a fuel tank 16 through a fuel metering and pressurizing system 17 in accordance with this invention to a fuel manifold 18 and thence through fuel injection devices 19 into the flame tubes 11b. The fuel injection devices 19 have selected pressure/flow characteristics and are equivalent to restrictive outlets from the manifold 18.

The fuel system 17 is arranged so that metering of the fuel at high pressures or in the main fuel pressurizing device is avoided.

In one embodiment, the low-pressure fuel-metering arrangement comprises a low-pressure or booster pump 20 (Figures 1 and 3), having its inlet connected to draw off fuel from the fuel tank 16 and its delivery connected to a conduit 21, and low-pressure metering means consisting of a throttle 22 in the conduit 21 and a relief valve 23 controlling return flow from conduit 21 through return conduit 24 to the fuel tank. This arrangement ensures that the pressure in conduit 21 upstream of the throttle 22 is maintained constant so that the fuel flow past the throttle 22 depends only on the throttle position. The low-pressure pump 20 is shown for convenience as a centrifugal pump.

Instead of maintaining the pressure upstream of the throttle constant in the manner shown in Figure 3, the low-pressure pump 20, relief valve 23 and return conduit 24 may all be omitted and the pipe 21 connected directly to fuel tank 16 which is closed and has connected to its upper end a constant air pressure source. For instance as shown in Figure 4, the fuel tank has an air supply pipe 36 connected to it, there being an air blower 37 and a loaded blow-off valve 38 in the pipe 36. The pressure in the fuel tank 16 will in this case be maintained at the blow-off pressure of valve 38.

Another low-pressure metering arrangement is illustrated in Figure 5. In this arrangement, the conduit 21 is again connected directly to the fuel tank 16. In this arrangement moreover the pump 20, throttle 22, bleed valve 23 and return conduit 24 are all omitted and a metering device 39 is connected in the conduit 21.

The metering device is of the eccentric piston type and comprises a main support structure 39a formed with parallel guides 40 in which slides a cylindrical casing 41 encircling a rotor 42 rotatively mounted in the structure 39a which also closes the ends of casing 41.

The rotor 42 is formed with a series of bores 42a each accommodating a plunger 43 which is urged into contact with the wall of the casing 41 by a spring 44. It will be seen that as the rotor 42 rotates the plungers 43 will be reciprocated in the bores 42a, the stroke of the plungers 43 being determined by the eccentricity of the rotor 42 with respect to the casing 41. This eccentricity can be adjusted through a lever 45 pivoted on the structure 39a and connected by a push/pull rod 46 to the casing 41; on rocking the lever 45 the casing 41 will slide in guides 40 moving the axes of the casing 41 and rotor 42 relative to one another.

The rotor 42 is mounted on a fixed shaft 47 having cut-away parts 48, 49 whereof the part 48 communicates through port 50 with the part of the conduit 21 upstream of the metering device 39 and the part 49 communicates through port 51 with the portion of conduit 21 which is downstream of the metering device 39.

It will be seen that on rotation of the rotor 42 in the direction of arrow 52 the plungers 43 will be reciprocated drawing in fuel through port 50 and delivering the fuel through port 51 towards the outlet end of the conduit 21.

It will be seen that the metering arrangements described above all operate at low pressure, thus avoiding the need for providing a main pressurizing pump of variable capacity capable of delivering fuel at high pressures.

The delivery end of conduit 21 feeds a fuel pressurizing pump 25 which is of the centrifugal kind (see Figure 3) and has a casing 25c and an impeller 25a mounted in bearings 25b in the casing and formed with radial vanes 26 which extend inwardly from the periphery of the impeller 25a part way only towards the centre of the impeller, thereby to leave a clear space 27 in the centre of the impeller 25a. The delivery end of conduit 21 leading from the booster pump 20 is connected to a nozzle 31 coaxial with the impeller 25a which nozzle conveniently directs the fuel flowing past throttle 22 as a jet against the surface of the impeller disc. These features of the pressurizing pump are also indicated in the diagrammatic illustration thereof in Figure 2.

An air vent 32 and vent pipe 33 leading to atmosphere is provided from the space 27 to minimize fuel leakage from the pump.

Encircling the impeller there are a ring of guide vanes 28 and a delivery scroll 29 to which is connected a delivery pipe 30 leading to the manifold 18 and fuel injection devices 19. As was stated above, the injection devices 19 are equivalent to flow restrictors, and the equivalent flow restrictor is indicated at 19a in Figure 2.

The fuel injection devices 19 may be of any convenient kind being such that the fuel flow through them is directly proportional to or is some other function of the fuel delivery pressure, and the restrictions afforded by the fuel injection devices (which are represented diagrammatically and for convenience only by the simple orifice element 19a in Figure 2) are selected so that even when the fuel flow to the gas-turbine engine is a maximum the pressurizing pump 25 will run only part full so that in operation of the fuel pressurizing pump 25 a free radially-inwardly-facing fuel surface 53 is formed.

It will be appreciated that since (a) The quantity of fuel being fed to the pressurizing pump is a volumetrically-metered quantity, (b) The fuel pressure required to deliver a given quantity of fuel through the fuel-injection devices 19 is determined by their flow characteristics, and (c) The pressure in pipe 30 is determined by the depth "$t$" (Figure 2) of fuel in the impeller 25a for any given rotational speed of the impeller, then, for a given fuel flow to the engine the depth "$t$" of fuel in the impeller will stabilize at a value such that the inflow to the pressurizing pump 25 equals the outflow through the injection devices 19.

If the impeller 25a is driven at a rotational speed which is constant throughout the operation of the engine, then the pressure in the delivery pipe 30 from the pressurizing pump 25 will be substantially proportional to the depth $t$ of fluid in the impeller. If, however, the pressurizing pump is driven by the engine, the relationship between the fuel depth $t$ and the pressure in the delivery pipe 30 will be a more complicated one.

The pressurizing pump 25 may be driven in any convenient manner for instance, as shown in Figure 1, the pump 25 may be mounted on the engine and driven through gearing 14a from the shaft 14, or as shown in Figure 6 the pump 25 may be driven by an electric motor 34, or by a fluid motor shown in Figure 7 as an air turbine 35 which can be supplied with pressure air from any convenient source.

It will be seen from the foregoing description that the present invention provides a fuel metering and pressurizing system in which the fuel is first metered at low pressure and is then pressurized to the high fuel-delivery pressure necessary for delivery to the gas-turbine engine. It will thus be seen that the invention avoids the necessity for providing metering devices capable of operating at high pressures.

By providing a fuel-pressurizing pump of the centrifugal type so designed in relation to the flow characteristics of the fuel-injection devices and the fuel flows required that it always operates only partly full and so that in operation there is always a free space at the centre of the pump, undesirable cavitation effects such as are experienced when centrifugal pumps are designed to run full, are substantially avoided.

I claim:
1. A fuel system for an internal combustion engine comprising fuel injection means, a fuel-pressurizing centrifugal pump, which centrifugal pump comprises a casing, a centrifugal impeller in said casing, said impeller having vanes extending over the radially-outer portion of the impeller to leave a vane-free space centrally of the impeller, a vent from said vane-free space to atmosphere, a fuel inlet connection to feed fuel into said vane-free space, and a fuel outlet from said casing radially outside said impeller, said outlet forming the sole outlet for fuel delivered by said impeller; a low-pressure fuel-metering system connected to said fuel inlet connection on said centrifugal pump to deliver a metered fuel flow thereto; means in said low-pressure fuel-metering system for selectively controlling the flow therethrough; and sole fuel delivery ducting means leading from said outlet means to said fuel injection means of said engine to deliver the whole of said metered fuel flow from said centrifugal pump through said fuel injection means said ducting and fuel-injection means presenting fuel flow-restricting means having an effective restriction controlling the delivery pressure of the pump.

2. A fuel system as claimed in claim 1, wherein said low-pressure metering system includes means to provide a constant-pressure source of fuel, a conduit connecting said source with the inlet to the eye of the impeller, and a throttle in said conduit.

3. A fuel system as claimed in claim 2, wherein said means to provide a constant-pressure source of fuel comprises a low-pressure pump, whereof the delivery is connected to said conduit, a relief valve in said conduit upstream of said throttle to maintain the fuel pressure upstream of the the throttle constant, and a return flow conduit leading from said relief valve to receive the flow therethrough and connected to deliver to the suction side of said low-pressure pump.

4. A fuel system as claimed in claim 1, wherein said low-pressure metering system comprises a fuel tank, a conduit connected at one end to said fuel tank and at its other end to said casing, a throttle in said conduit, means to supply pressure air to said fuel tank, and means to maintain the air pressure constant.

5. A fuel system as claimed in claim 4, wherein said means to supply pressure air includes an air blower and the means to maintain the air pressure constant comprises a relief valve arranged between said blower and the fuel tank.

6. A fuel system as claimed in claim 1, wherein said low-pressure metering system comprises a cylindrical casing, a rotor rotatively mounted in said cylindrical casing eccentrically thereof, a plurality of plungers each accommodated in a corresponding bore in said rotor, springs to load said plungers into contact with said casing, whereby on rotation of the rotor the plungers are reciprocated in the bores, means to vary the eccentricity of the rotor with respect to the casing, and means affording suction and delivery spaces each of which spaces is arranged to communicate with said bores during part only of each revolution of said rotor.

References Cited in the file of this patent

UNITED STATES PATENTS

| | | |
|---|---|---|
| 1,345,895 | Seguin | July 6, 1920 |
| 2,290,350 | Olches | July 21, 1942 |
| 2,429,374 | Shade | Oct. 21, 1947 |
| 2,547,959 | Miller | Apr. 10, 1951 |
| 2,575,923 | McMahan | Nov. 20, 1951 |
| 2,599,507 | Wyckoff | June 3, 1952 |